H. E. PAOLUCCI.
LARD EXTRACTING MACHINE.
APPLICATION FILED JAN. 31, 1913.

1,083,129.

Patented Dec. 30, 1913
6 SHEETS—SHEET 4.

Inventor
H. E. Paolucci
By Victor J. Evans
Attorney

Witnesses

H. E. PAOLUCCI.
LARD EXTRACTING MACHINE.
APPLICATION FILED JAN. 31, 1913.

1,083,129.

Patented Dec. 30, 1913.
6 SHEETS—SHEET 6.

Witnesses
E. R. Ruppert
P. M. Smith

Inventor
H. E. Paolucci
By Victor J. Evans
Attorney

UNITED STATES PATENT OFFICE.

HENRY E. PAOLUCCI, OF SAN ANTONIO, TEXAS.

LARD-EXTRACTING MACHINE.

1,083,129.  Specification of Letters Patent.  Patented Dec. 30, 1913.

Application filed January 31, 1913. Serial No. 745,467.

*To all whom it may concern:*

Be it known that I, HENRY E. PAOLUCCI, a citizen of the United States, residing at San Antonio, in the county of Bexar and State of Texas, have invented new and useful Improvements in Lard-Extracting Machines, of which the following is a specification.

This invention relates to lard dispensing machines, and while the machine will be described for the specific purpose stated, it will be understood that any substance of substantially the same consistency as lard may be equally as well dispensed by the apparatus referred to.

The main object of the invention is to provide a machine or apparatus by means of which lard may be extracted directly from the original shipping vessel, such as a barrel, and dispensed in wholesale or retail quantities, so that the lard will be expelled through and delivered from a dispensing nozzle, beneath which any suitable receptacle may be placed.

A further object of the invention is to provide a machine of the class described, which is adjustable in height, so as to accommodate a barrel or other vessel of any desired height.

A further object of the invention is to provide an adjustable or expansible hopper which is adapted for movement in such barrel or vessel, and which acts to gather in or center the lard in a proper condition to receive the bucket, hereinafter described. This hopper is made to expand and contract in accordance with the variation in the diameter or internal dimensions of the barrel or vessel, so as to scrape the inner walls thereof and gather in all of the lard.

A further object of the invention is to provide a lard extracting bucket which is mounted for movement into and out of the hopper, and which is adapted to be opened and closed, so as to receive and hold its charge of lard, together with means for locking said bucket in a predetermined dispensing position.

A further object of the invention is to provide means for audibly indicating the fact that the bucket has become filled with lard, so as to prevent overfilling thereof, and the loss of lard.

A further object of the invention is to provide a novel arrangement of dispensing nozzle, so combined with a discharge pipe of the bucket, as to be movable into and out of coupled engagement therewith.

With the above and other objects in view, the invention consists in the construction, combination and arrangement of parts, as will be hereinafter more fully described, illustrated in the accompanying drawings, and pointed out in the claims hereunto appended.

In the drawings: Fig. 16 is a plan view of the mechanism for locking the plunger operating shaft.

Referring to the drawings, 1 designates a shipping vessel in the form of an ordinary barrel, in which the lard to be dispensed is contained. The machine embodies a supporting stand, which is shown as substantially triangular in horizontal section, so as to leave the same open on one side, the said stand comprising three legs 2 which are connected near their upper ends by top cross bars 3, and lower down by cross rungs or braces 4.

Figure 1:
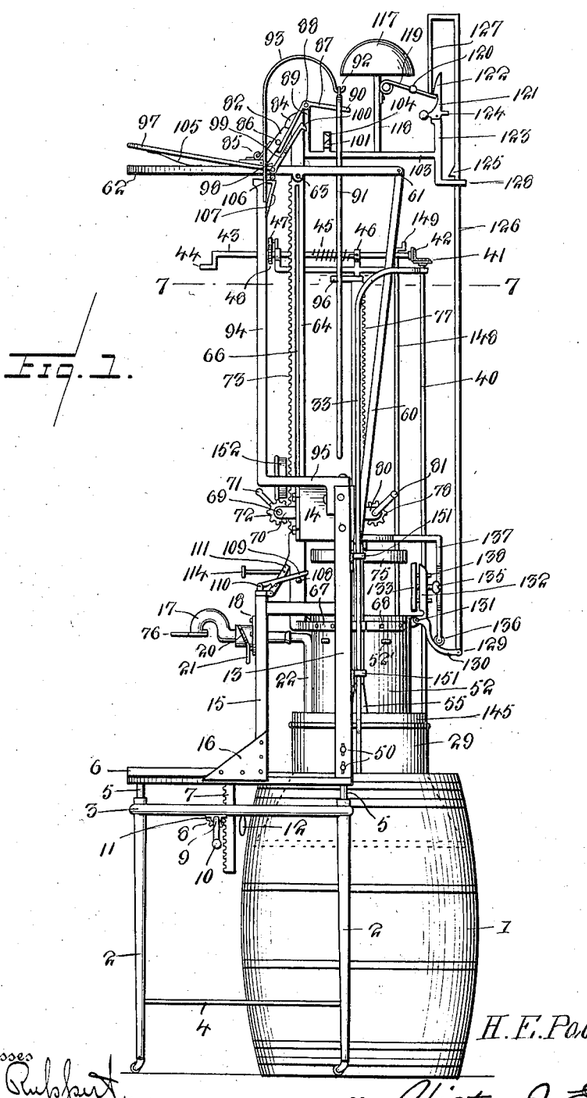
Figure 1 is a side elevation of a lard dispensing machine, embodying the present invention, showing the lard extracting bucket and nozzle in dispensing position.

Each of the legs 2, in the preferred embodiment of the invention, is made tubular, so as to receive downwardly extending guide rods 5 on the bottom of a table 6, which is thereby made adjustable up and down with relation to the remainder of the stand, so as to enable said table 6 to be brought into a plane substantially in line with the top edge of the barrel 1, as illustrated in Fig. 1.

The means for raising and lowering the table is shown as consisting of a rack bar 7 which extends downwardly from the bottom of the table, where it is engaged by a pinion 8 mounted on a shaft 9 provided with an operating crank handle 10, by turning which the rack bar 7 may be moved upwardly and downwardly to correspondingly elevate and depress the table 6.

The shaft 9 is mounted in suitable bearings 11 secured to the top connecting bars 3 of the stand, and after the desired adjustment referred to has been obtained, the crank handle 10 is adapted to be placed in a keeper loop 12 secured to one of the bars 3, so as to prevent the said hand crank from turning and thereby lowering the table 6.

Oppositely arranged stationary side bars 13 form a portion of the main frame of the machine, and extend upwardly from the table 6 in rigid relation to the latter, and in planes at opposite sides of the barrel or vessel 1. These side bars form portions of the machine frame, and are connected at their upper ends by a cross head 14, to which other portions of the frame are connected, as will hereinafter appear.

Figures 2, 12, 13, 14:
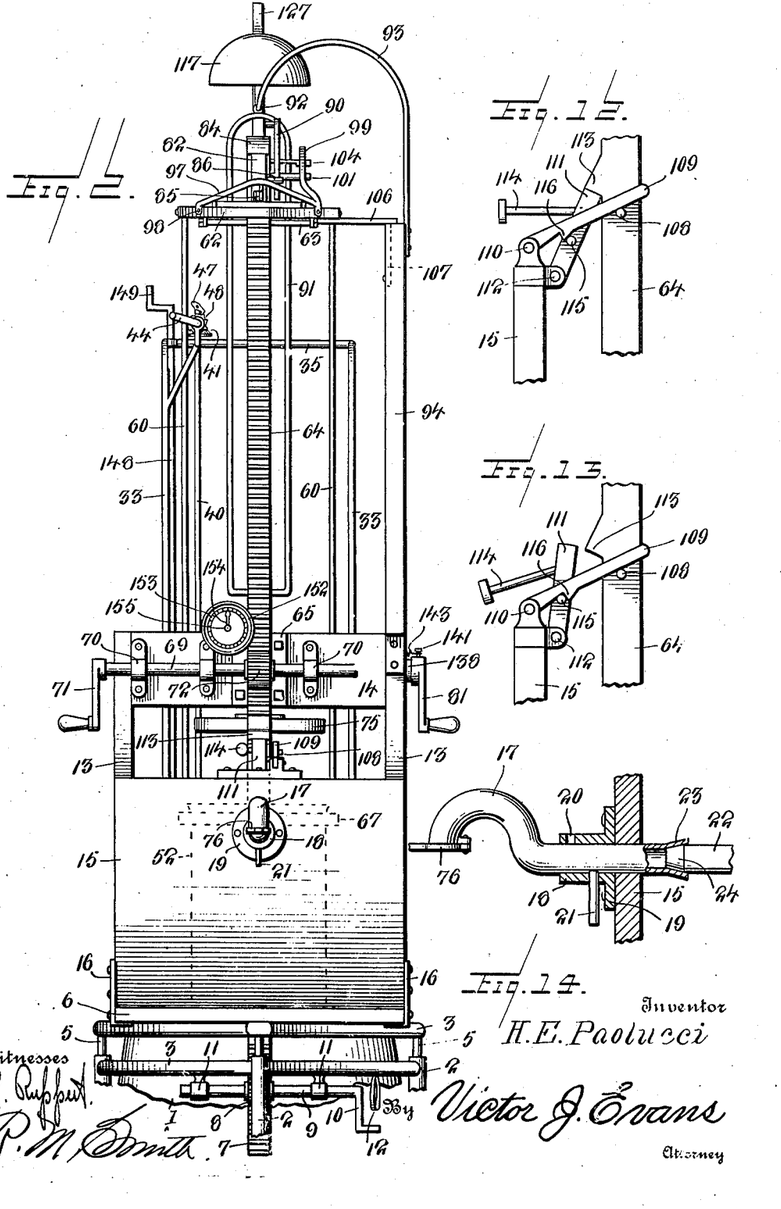
Fig. 2 is a front elevation of the upper portion of the machine on an enlarged scale, the underlying supporting stand being partly broken away.
Fig. 12 is a side elevation of the locking dog and trip mechanism associated with the bucket actuating rack bar.
Fig. 13 is a similar view of the same parts, showing the locking dog held in its inoperative position.
Fig. 14 is a detail vertical sectional view, partly in elevation, of the dispensing nozzle and the operating means therefor.

Another frame member 15 extends upwardly from the table 6, and is rigidly connected thereto by corner plates or braces 16, as shown in Fig. 1. This frame member 15 is in the form of a vertical plate or board, and forms a support for the dispensing nozzle 17. This nozzle is mounted for longitudinal and axial movement in a collar 18 which is provided with a base flange 19, and bolted or otherwise fastened to the support 15. The collar 18 is provided with a spiral groove 20 which receives a handle 21 in the form of a pin fastened to the nozzle 17, as best illustrated in Fig. 14, so that by grasping the handle 21 and moving the same through a half circle, the nozzle is turned from the operative or dispensing position, illustrated in Figs. 1 and 14 for example, to an inverted or non-dispensing position, as shown for example in Fig. 4. In this axial or turning movement of the nozzle, the pin or handle 21 by traversing the slot 20 causes the body portion of the nozzle to move longitudinally through the collar 18, so as to effect a coupling or uncoupling between the inner end of said nozzle and the discharge pipe 22, with which the lard extracting bucket is equipped, as will hereinafter appear.

By reference to Fig. 14, it will be observed that the inner end of the nozzle 17 is flared and tapered, as shown at 23, and the adjacent end of the pipe 22 is correspondingly constricted and tapered, as shown at 24, so as to obtain a close non-leaking fit between the pipe 22 and the nozzle 17 at their coupling point. It may be explained at this time that the longitudinal movement of the nozzle 17 is necessary, in order to enable the discharge pipe 22 to clear the nozzle 17, during the upward and downward movements of the lard extracting bucket.

Referring now particularly to Figs. 3, 4, 8 and 9, 25 designates what may be termed an inverted funnel-shaped hopper having a downwardly flaring lower section 26 which is split or divided, as shown at 27, to permit said tapered portion to expand and contract in size, in accordance with the internal shape and dimensions of the vessel or barrel 1, in order that the bottom edge of the section 26 may scrape the inner walls of the barrel and enable the hopper to gather in all of the lard, as it is depressed from the top toward the bottom of said barrel. To secure good contact, the bottom of the section 26 may be grooved to receive a packing ring 28. This packing ring is located on the exterior of the section 26 of the hopper and moves always in contact with the inner surface of the barrel. The hopper also comprises a cylindrical upper section 29, to which the lower section 26 is connected by links 30, said links being attached to the section 26 at the points 31, and being pivotally connected, at 32, to the side bars 33 of a bail-shaped frame extending upwardly to a point considerably above the hopper, the side bars being connected at the top by a laterally offset connecting bar 35.

Figures 3, 8, 9:
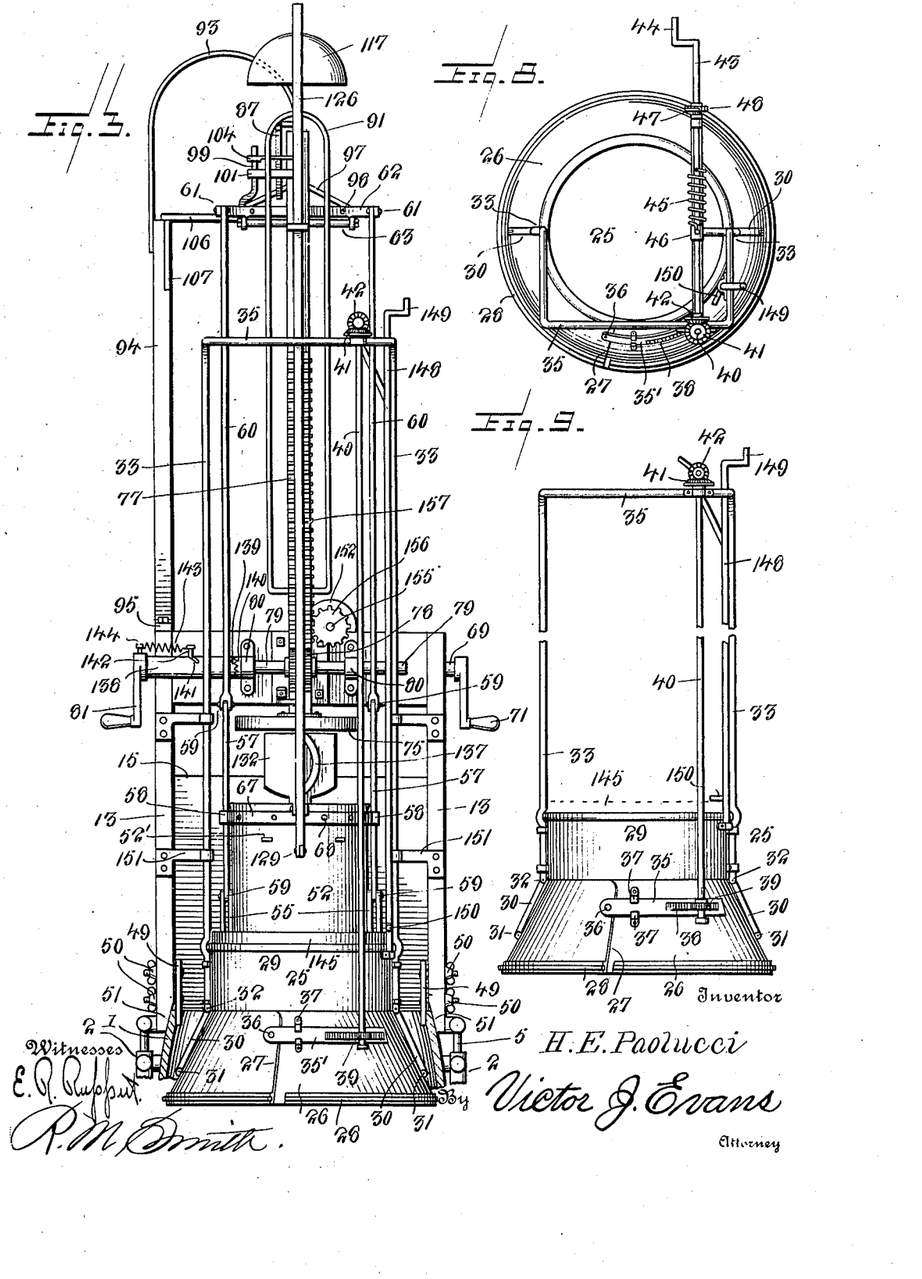
Fig. 3 is a rear elevation of the same, showing the shipping vessel or barrel in diametrical section.
Fig. 8 is a top plan view of the hopper and the frame carried thereby.
Fig. 9 is a rear elevation of the same.

In order to provide for expanding and contracting the lower flared section 26 of the hopper, a rack bar 35′, in the form of a strap, is attached to the overlapping edge of said bottom section at the point 36, and works between guides 37, and is provided with rack teeth 38 which are engaged by a pinion 39 on the lower end of a vertical shaft 40 mounted in suitable bearings on the hopper and top bar of the hopper frame, as shown in Figs. 8 and 9, said shaft being provided at its upper end with a bevel pinion 41 which meshes with another bevel pinion 42 on a horizontally disposed hopper contracting shaft 43 provided at one end with a crank handle 44.

Encircling the shaft 43 is a hopper expanding coiled spring 45, one end of which is connected to said shaft, and the other end to a fixed bearing collar 46, in which the shaft turns. This spring 45 is so mounted that the tension thereof will be exerted to turn the shafts 43 and 40 in a direction which will cause the flared bottom section of the hopper to expand and ride in contact with the inner surface of the barrel 1. By operating the crank handle 44, the tension of the spring 45 may be overcome, thereby contracting the lower portion of the hopper, so that it may be inserted or withdrawn through the top of the barrel or vessel. When the hopper is so contracted in size, it may be held in such contracted condition by a pawl 47 on the frame of the hopper, which engages a ratchet wheel 48 on the hopper contracting shaft 43.

The hopper and its frame, and the parts carried thereby, as hereinabove just described, is disconnected from the remainder of the frame of the machine but is adapted to be depressed from time to time, in order to keep the same filled with lard, by one or more projections 52' on the bucket 52 pressing downwardly on the ring 145, which forces the hopper downwardly into the barrel.

In order to maintain a fixed relation between the barrel 1 and the frame of the machine, clamps 49 are arranged upon the inner side of the side bars 13 of the frame, as shown in Fig. 3, and are manipulated by means of thumb screws or nuts 50, so as to bear against the inside of the top edge of the vessel or barrel 1, and clamp such edge between themselves and the lower extremities of the side bars 13 which are beveled or chamfered, as shown at 51.

Figure 4:
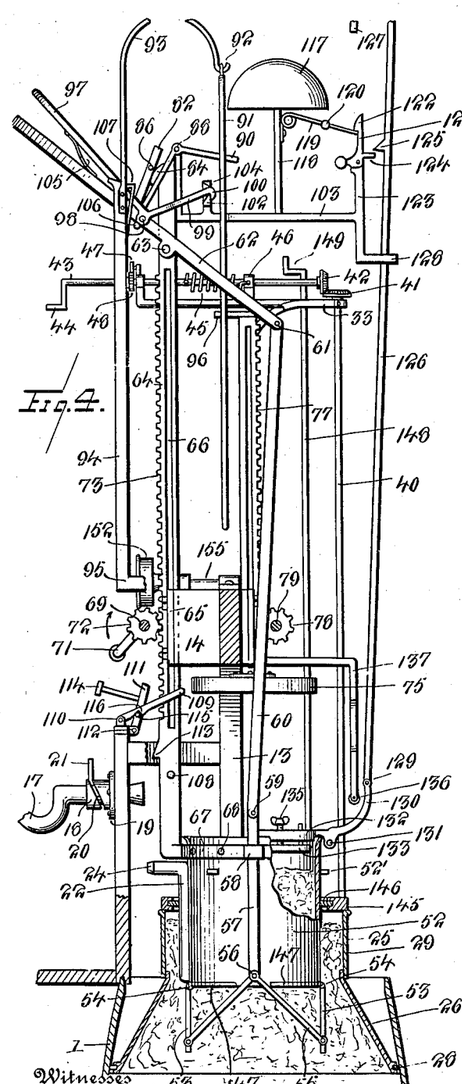
Fig. 4 is a side elevation of the machine, partly in section, showing the bucket moved downwardly and receiving its charge of lard.
Figures 5, 10, 11:
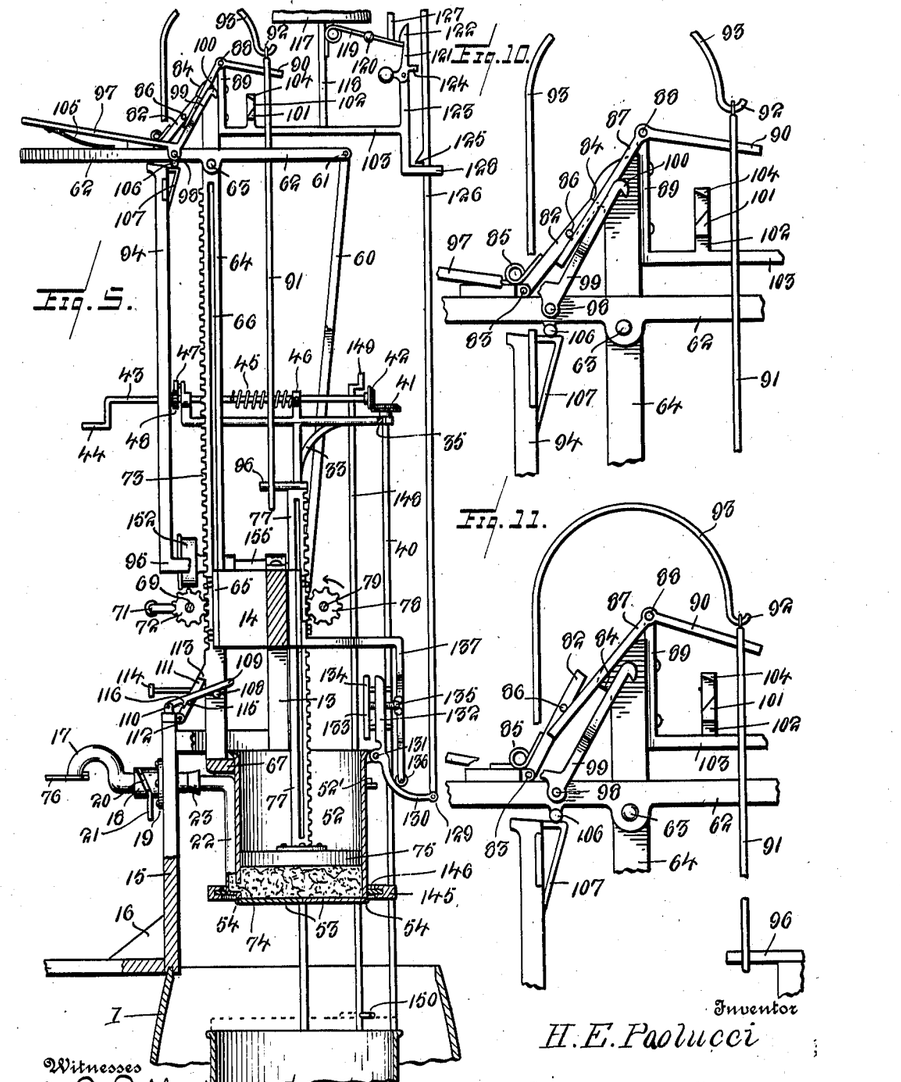
Fig. 5 is a view similar to Fig. 4, but illustrating the bucket raised and locked in its dispensing position, the bottom of the bucket closed, and the expressing plunger moving downwardly within the bucket.
Fig. 10 is a detail side elevation illustrating the latch mechanism.
Fig. 11 is a similar view showing the latch mechanism tripped.
Figure 6:
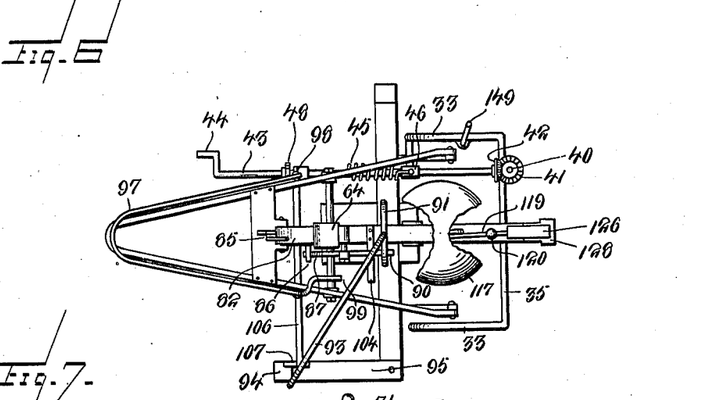
Fig. 6 is a top plan view of the machine.
Figure 7:
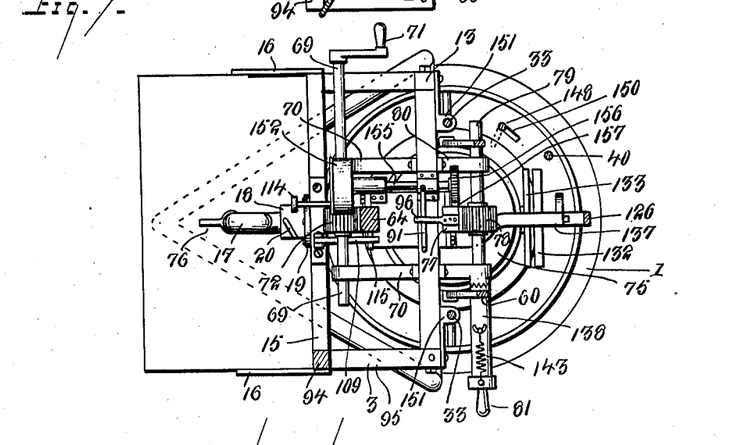
Fig. 7 is a horizontal cross section on the line 7—7 of Fig. 1.

The lard extracting bucket 52 is adapted for movement into and out of the hopper 25, as illustrated for example in Figs. 4 and 5. This bucket is in the for of a hollow cylinder open at both top and bottom, but the bottom thereof is adapted to be closed by means of a pair of shutters 53 which are hinged to the bottom edge of the bucket, at 54. Connected to the shutters 53 are inwardly and upwardly inclined links 55 which pivotally connect, at 56, to the lower ends of a pair of slide rods 57 arranged to work through guides 58 on opposite sides of the bucket 52. Pivotally connected, at 59, to the upper ends of the slide rods 57 are connecting rods 60, the upper ends of which are pivotally connected, at 61, to a V-shaped shutter operating lever 62. This lever 62 is fulcrumed, at 63, on and near the upper end of a vertically moving rack bar 64 which is guided in its up and down movements by suitable guide ribs 65 on the cross head 14 of the machine frame, said ribs working in grooves 66 in the side faces of the rack bar 64. The rack bar 64 is provided at its lower end with an annular band 67 extending perpendicular thereto and around the upper part of the lard bucket 52, to which it is riveted or otherwise fixedly attached, as shown at 68.

69 represents the bucket operating shaft which is mounted in suitable bearings 70 on the cross head 14, said shaft being provided with an operating crank handle 71, and having fast thereon a pinion 72 which meshes with the teeth 73 of the rack bar 64. It will be observed that by revolving the shaft 69, the rack bar 66, and, therefore, the lard bucket 52, will be correspondingly moved upwardly and downwardly, the downward position of the bucket being illustrated in Fig. 4, and the upward dispensing position thereof being illustrated in Fig. 5.

The last-named figure shows the coupled connection between the nozzle 17 and the discharge pipe 22 of the lard bucket, it being observed that the pipe 22 communicates with the bottom of the bucket 52 by means of a port 74. In the same figure, the expressing plunger 75 is shown as moving downwardly in the bucket 52, and pressing the lard through the port 74 and pipe 22 into the nozzle 17, the discharge end of which is capable of being opened and closed by means of a gate or shutter 76. As shown in Fig. 5, the plunger 75 has an upwardly extending rack bar 77 rigidly secured thereto and meshing with a pinion 78 fast on a plunger operating shaft 79 mounted in suitable bearings 80 on the machine frame, and provided with an operating crank handle 81. By means of the mechanism just described, the plunger 75 may be shifted upwardly and downwardly, and when it is moved downwardly in the bucket 52, it serves to express the lard therefrom.

The lever 62 which is fulcrumed directly on the vertically movable rack bar 64 is carried thereby at all times, and, therefore, when the bucket 52 is moved upwardly or downwardly, the shutter operating connections are simultaneously moved therewith. When the bucket 52 is at the upper limit of its movement, or in dispensing position, as shown in Fig. 5, a latch 82, pivotally mounted at 83 on the lever 62, engages under a shoulder 84 at the upper end of the rack bar 64, as shown in Figs. 5 and 10, the latch 82 being held in engagement with said shoulder 84 by means of a spring 85. The latch 82 is provided with a laterally projecting trip pin 86, against which operates one arm 87 of a lever, fulcrumed at 88 on a bracket 89 carried by the rack bar 64. The other arm 90 of said lever extends through an elongated open center link 91, which is suspended at its upper end on a hook 92, at the overhanging extremity of a spring arm or support 93 secured to the upper end of the vertical arm 94 of a bracket, the lower horizontal arm 95 of which is secured to the frame of the machine, adjacent to the cross head 14, as shown in Fig. 1. The link 91 extends downwardly far enough to embrace and engage a pin 96 projecting laterally from the upper extremity of the rack bar 77, as shown in Fig. 5, so that when the plunger 75 has reached the lower limit of its movement in the bucket 52, the pin 96 will pull the link 91 downwardly, causing the upper end of said link to depress the arm 90 of the trip lever, bringing the arm 87 of said lever against the pin 86 and moving the latch 82 out of engagement with the shoulder 84 on the rack bar 64. This releases or unlocks the rack bar in readiness for another downward movement of the lard extracting bucket 52.

In order to lock the lever 62 against pivotal movement, when the shutters 53 are swung open and made to assume a vertical position, as shown in Fig. 4, so as to readily force their way into the body of lard in the hopper, I provide a hand operated lever 97 which is pivoted, at 98, to the lever 62. The lever 97 is provided with a locking arm 99 extending at an angle thereto and provided with a locking lip or hook 100 at the extremity thereof, which is adapted to engage a keeper 101 extending laterally from the post 102 on the horizontally projecting arm 103 of the bracket 89, above referred to. Arranged above the fixed keeper 101 is a spring jaw 104 which is adapted to yield upwardly, as the hook 100 passes over the keeper 101, said spring jaw serving to hold the hook in engagement with the keeper, this also being assisted by a spring 105 which is interposed between the handle portion of the lever 97 and the corresponding portion of the shutter operating lever 62. In order to unlock the lever 62, the lever 97 is pressed toward the lever 62, thereby lifting the spring jaw 104 and allowing the hook 100 to disengage itself from the keeper 101. This being done, the lever 62 may be moved from the position illustrated in Fig. 4 to the position illustrated in Fig. 5, thereby moving the shutters from the open position shown in Fig. 4 to the closed position shown in Fig. 5.

After the lard has been forced out of the bucket 52 by the action of the plunger 75, as the bucket is moved downwardly to obtain a new charge, the rack bar 64 necessarily moves downwardly therewith, carrying the pivot 63 of the lever 62. In such movement, a projection 106 on the bottom of the lever 62 is held back by a spring catch 107 on the upper end of the bracket arm 94, thereby causing the inner end of said lever to be depressed, and by means of the connections between said lever 62 and the shutters 53, the latter are moved from the closed to the open position shown in Fig. 5 to the open position shown in Fig. 4. The spring catch 107 is similar to that used on the staffs of umbrellas, and is adapted to recede when the lever 62 is moved upwardly, so as to allow the projection 106 to pass by the spring 107, the latter snapping under said projection, when the parts reach the position shown in Fig. 5.

When the bucket 52 reaches the upper limit of its movement, where it is in dispensing position, a pin 108 strikes against a latch 109 pivotally mounted, at 110, on the nozzle support 15, and thereby releases a locking dog 111 which is pivotally mounted, at 112, on the nozzle support 15, as illustrated in Figs. 12 and 13. The dog 111 then moves by gravity under a shoulder 113 on the rack bar 64, as shown in Fig. 12, thereby sustaining the lard bucket 52 in position to effect a coupling between the discharge pipe 22 and the nozzle 17. To release the rack bar 64, the dog 111 is swung outwardly by means of a suitable handle 114, until a pin 115 on the dog engages behind a shoulder 116 on the latch 109, as shown in Fig. 13. The operator is advised when the lard bucket 52 is filled by the sounding of a bell 117 supported by a post 118 extending upwardly from the horizontal arm 103 of the bracket 89.

Figure 15:
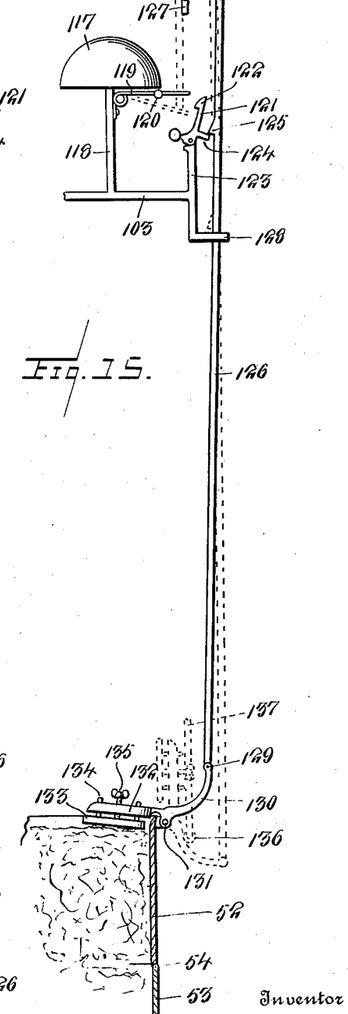
Fig. 15 is a detail sectional view illustrating the bell tripping mechanism.

119 designates a spring arm carrying a bell hammer 120, said arm projecting far enough to one side of the bell to be engaged by a hammer jack 121 having a shoulder 122 adapted to engage the extremity of the hammer arm 119, as illustrated for example in Figs. 1, 4 and 15. The hammer jack is pivotally mounted on an extension 123 of the arm 103 and is provided with a lip 124 which is adapted to be engaged by a tappet shoulder 125 on a trip rod 126, the upper end of which is bent over and extended downwardly to form a depressing finger 127 adapted to come into contact with the upper side of the hammer arm 119 to depress the latter, as shown in Fig. 1, when the rod 126 is moved downwardly.

The trip rod 126 extends through a guide 128 forming an extension of the arm 103 of the bracket 89, and the lower end of said trip rod is pivotally connected, at 129, to one arm 130 of a bell tripping lever which is fulcrumed, at 131, on the outer side of the bucket 52, as best illustrated in Fig. 15. The other arm 132 of the bell tripping lever is adapted to project within the bucket 52, and is provided with an adjustable face plate 133 having guide pins 134 which pass through openings in the lever 132, the face plate 133 being adjustable by means of a thumb screw 135 toward and away from the lever 132, so that said face plate may be adjusted with relation to the mass of lard, as it fills the bucket, in order to enable the bell to be tripped before the bucket becomes overfilled. By now referring to said Fig. 15

15, it will be observed that as the lard fills the bucket, it comes into contact with the face plate 133, and thereby moves the bell tripping lever a sufficient distance to pull downwardly on the rod 126. This causes the shoulder 125 to operate against the lip 124, thereby rocking the jack out of engagement with the hammer arm 119 and allowing the hammer 120 to strike against the bell 117. As the bucket is then moved upwardly by the means hereinabove described, the arm 130 of the bell tripping lever comes in contact with a roller 136 on a fixed arm 137 projecting from the stationary machine frame, as shown in Figs. 1 and 5, and the arm 130 is depressed until the other arm 132 of the bell tripping lever, together with the adjustable face plate 133 thereon, is rocked outwardly, as indicated by dotted lines in Fig. 15. This causes a sufficient downward movement of the rod 126 to cause the finger 127 thereof to act with a depressing effect on the hammer arm 119, which allows the jack 121 to swing inwardly, until it engages said hammer arm and holds the same depressed, as shown in Figs. 1 and 4. The hammer is now reset ready for another charging movement of the lard bucket.

In order to sustain the weight of the plunger 75, and the parts directly connected therewith, the plunger operating shaft 79 and the handle 81 thereof are constructed and arranged as illustrated in detail in Figs. 16, in which it will be observed that the handle 81 is provided with a sleeve 138 which surrounds and is slidable on the shaft 79 and is provided with a clutch face 139 adapted to engage a corresponding clutch face 140 on the bearing bracket 80, in which the shaft 79 is journaled. The sleeve 138 is provided with a cam slot 141 which receives a pin 142 on the shaft 79, and a contractile spring 143 has one end fastened to said pin 142, and the other end fastened to a pin 144 on the hub of the handle 81. It will be observed that when the handle 81 is turned, the sleeve 138 will be caused to rotate partially around the shaft 79, and the cam slot 141 acting on the pin 142 will cause the clutch face 139 to recede or move out of engagement with the clutch face 140. This unlocks the crank 81 from the bracket 80, and allows the shaft 79 to be turned for actuating the rack and pinion mechanism to raise and lower the plunger. Upon releasing the handle 81, the spring 143 restores the parts to the position illustrated in Fig. 16, effecting an interlocked engagement with the sleeve 138 and the bracket 80 which prevents any further movement of the plunger 75.

Encircling the lard bucket 52 is a scraper ring 145 having a flexible packing ring 146 set into a groove in its inner face, as shown in Fig. 4. This packing ring 146 bears closely against the outer surface of the lard bucket and scrapes the lard therefrom as the bucket moves upwardly out of the hopper. The ring 145 also forms a closure for the upper part or neck of the hopper. As the lard bucket moves upwardly, flanges 147 at the bottom edge thereof come in contact with the under side of the ring 145, and carry the ring on upward with the bucket.

After the barrel or vessel 1 has been emptied, and it is desired to remove the hopper, a rock shaft 148, journaled in bearings on the hopper and the hopper frame, is turned by means of a crank handle 149, at the upper end thereof, so as to throw a pin 150 at or near the lower end of the shaft 148 inwardly over the scraper ring 145, in the manner illustrated in Fig. 9. Consequently, when the ring 145 is carried upwardly by the bucket 52, it engages the pin 150, and thereby lifts the hopper out of the vessel or barrel, after which the barrel or vessel may be unclamped from the machine frame and removed.

The vertical side bars 33' of the hopper frame pass through guides 151 on the oppositely located side bars 13 of the machine frame, as illustrated in Fig. 3, which serves to guide and steady the movement of the hopper.

From the foregoing description, it will be observed that the frame of the machine may be adjusted into proper relation to the vessel or barrel, and clamped thereto prior to the operation of the machine. It will also be seen that the expanding and contracting hopper may be gradually depressed in the lard contained in the vessel, so as to gather in and centralize the lard within the upper cylindrical portion of the hopper. It will also be seen that the lard bucket is movable into and out of the hopper and adapted to have its lower end opened and closed, as required, and that the bucket is adapted to be locked in its dispensing position, so that the discharge pipe thereof may be coupled to the dispensing nozzle, beneath which a suitable receptacle is adapted to be supported by the table. The bucket and the expressing plunger operating therein are operable by independent means, and the shutters which open and close the bottom of the lard bucket are automatically opened, as the bucket starts to move downwardly to receive a fresh charge. It will also be observed that as soon as the bucket becomes filled with a sufficient amount of lard, an alarm is automatically sounded, thus advising an operator of the fact. The amount of lard expressed from the lard bucket is shown by an indicator 152 at the front of the machine, said indicator, as shown in Fig. 2, embodying a dial 153, and an indicator hand 154, on the shaft 155 of which is a dial operating gear 156 which meshes with rack teeth 157 on one edge of the plunger operating rack bar 77. The dial 153 will be graduated, so as to indicate the amount of lard in weight forced through the dispensing nozzle in each depression of the plunger.

What is claimed is:

1. In a machine for dispensing lard from a shipping vessel, a machine frame, a lard centering hopper adapted for movement in such vessel, a lard extracting bucket movable into and out of the hopper, and means for actuating the bucket.

2. In a machine for dispensing lard from a shipping vessel, a machine frame, an expansible lard centering hopper adapted for movement in such vessel, a lard extracting bucket movable into and out of the hopper, and means for actuating the bucket.

3. In a machine for dispensing lard from a shipping vessel, a machine frame, an expansible lard centering hopper adapted for movement in such vessel, a lard extracting bucket movable into and out of the hopper, means for actuating the bucket, a shaft for contracting said hopper, and a spring acting on said shaft to expand the hopper when said shaft is free.

4. In a machine for dispensing lard from a shipping vessel, a machine frame, an expansible lard centering hopper adapted for movement in such vessel, a lard extracting bucket movable into and out of the hopper, means for actuating the bucket, and means for contracting the hopper.

5. In a machine for dispensing lard from a shipping vessel, a machine frame, an expansible lard centering hopper adapted for movement in such vessel, a lard extracting bucket movable into and out of the hopper, means for actuating the bucket, means for contracting the hopper, and locking means for holding the hopper contracted.

6. In a machine for dispensing lard from a shipping vessel, a machine frame, a lard centering hopper adapted for movement in such vessel, a lard extracting bucket movable into and out of the hopper, means for actuating the bucket, and hopper elevating means.

7. In a machine for dispensing lard from a shipping vessel, a machine frame, a lard centering hopper adapted for movement in such vessel, a lard extracting bucket movable into and out of the hopper, means for actuating the bucket, and means on the bucket for lifting the hopper.

8. In a machine for dispensing lard from a shipping vessel, a machine frame, means for raising and lowering said frame, a lard centering hopper adapted for movement in such vessel, a lard extracting bucket movable into and out of the hopper, and means for actuating the bucket.

9. In a machine for dispensing lard from a shipping vessel, a machine frame, means for raising and lowering said frame, a lard centering hopper adapted for movement in such vessel, a lard extracting bucket movable into and out of the hopper, means for actuating the bucket, and locking means for holding the frame at any height to which it is adjusted.

10. In a machine for dispensing lard from a shipping vessel, a supporting stand, a machine frame adjustable vertically with relation to said stand, a lard centering hopper adapted for movement in such vessel, a lard extracting bucket movable into and out of the hopper, and means for actuating the bucket.

11. In a machine for dispensing lard from a shipping vessel, a supporting stand, a machine frame adjustable vertically with relation to said stand, a lard centering hopper adapted for movement in such vessel, a lard extracting bucket movable into and out of the hopper, means for actuating the bucket, and means for clamping the frame to such vessel.

12. In a machine for dispensing lard from a shipping vessel, a machine frame, a lard centering hopper adapted for movement in such vessel, a frame carried by the hopper, and hopper expanding and contracting means on said hopper and frame.

13. In a machine for dispensing lard from a shipping vessel, a machine frame, a lard centering hopper adapted for movement in such vessel, a frame carried by the hopper, a lard extracting bucket movable into and out of the hopper, means for actuating the bucket, and means on the hopper frame for effecting an engagement between the bucket and hopper whereby the bucket in its upward movement is caused to lift the hopper.

14. In a machine for dispensing lard from a shipping vessel, a machine frame, a lard centering hopper adapted for movement in such vessel, a lard extracting bucket movable into and out of the hopper, means for actuating said bucket, and means for opening and closing the bottom of said bucket.

15. In a machine for dispensing lard from a shipping vessel, a machine frame, a lard centering hopper adapted for movement in such vessel, a lard extracting bucket movable into and out of the hopper, means for actuating the bucket, shutters for opening and closing the bottom of said bucket, and operating means for said shutters.

16. In a machine for dispensing lard from a shipping vessel, a machine frame, a lard centering hopper adapted for movement in such vessel, a lard extracting bucket movable into and out of the hopper, means for actuating the bucket, shutters for opening and closing the bottom of the bucket, and a lever movable with the bucket and connected with said shutters for operating the same.

17. In a machine for dispensing lard from a shipping vessel, a machine frame, a lard centering hopper adapted for movement in such vessel, a lard extracting bucket movable into and out of the hopper, means for actuating the bucket, shutters carried by the bucket and adapted to open and close the bottom thereof, and means operating automatically to open said shutters in the downward movement of the bucket.

18. In a machine for dispensing lard from a shipping vessel, a machine frame, a lard centering hopper adapted for movement in said vessel, a lard extracting bucket movable into and out of the hopper, means for actuating the bucket, shutters on the bucket adapted to open and close the bottom thereof, means for automatically opening said shutters in the downward movement of the bucket, and means for locking the shutters open.

19. In a machine for dispensing lard from a shipping vessel, a machine frame, a lard centering hopper adapted for movement in such vessel, a lard extracting bucket movable into and out of the hopper, means for actuating the bucket, shutters on the bucket for opening and closing the bottom thereof, means operating automatically on the downward movement of the bucket to open said shutters, locking means for holding the shutters open, and manually operated means for unlocking and closing said shutters.

20. In a machine for dispensing lard from a shipping vessel, a machine frame, a lard centering hopper adapted for movement in such vessel, a lard extracting bucket movable into and out of the hopper, means for actuating the bucket, means for opening and closing the bottom of the bucket, and an expressing plunger mounted for movement into and out of the bucket.

21. In a machine for dispensing lard from the shipping vessel, a machine frame, a lard centering hopper adapted for movement in such vessel, a lard extracting bucket movable into and out of the hopper, means for actuating the bucket, means for opening and closing the bottom of the bucket, an expressing plunger adapted for movement into and out of the bucket, and rack and pinion mechanism for actuating said plunger.

22. In a machine for dispensing lard from a shipping vessel, a machine frame, a lard centering hopper adapted for movement in such vessel, a lard extracting bucket movable into and out of the hopper, means for actuating the bucket, means for opening and closing the bottom of the bucket, an expressing plunger adapted for movement into and out of the bucket, and means for locking the bucket in dispensing position.

23. In a machine for dispensing lard from a shipping vessel, a machine frame, a lard centering hopper adapted for movement in such vessel, a lard extracting bucket movable into and out of the hopper, means for actuating the bucket, a lard expressing plunger adapted for movement into and out of the bucket, means for locking the bucket in dispensing position, and mechanism for tripping the bucket locking means.

24. In a machine for dispensing lard from a shipping vessel, a machine frame, a lard centering hopper adapted for movement in such vessel, a lard extracting bucket movable into and out of the hopper, means for actuating the bucket, means for opening and closing the bottom of the bucket, means for locking the bucket in dispensing position, a discharge pipe for said bucket, and a dispensing nozzle with which said discharge pipe is adapted to register.

25. In a machine for dispensing lard from a shipping vessel, a machine frame, a lard centering hopper adapted for movement in such vessel, a lard extracting bucket movable into and out of the hopper, means for actuating the bucket, means for opening and closing the bottom of said bucket, means for locking the bucket in dispensing position, a discharge pipe for said bucket, and a dispensing nozzle supported by a stationary part of the frame and shiftable into and out of coupled connection with said discharge pipe.

26. In a machine for dispensing lard from a shipping vessel, a machine frame, a lard centering hopper adapted for movement in such vessel, a lard extracting bucket movable into and out of the hopper, means for actuating said bucket, a discharge pipe for said bucket, and a shiftable dispensing nozzle mounted for longitudinal and axial movement in a stationary part of the frame and adapted to be moved into and out of coupled engagement with said discharge pipe.

27. In a machine for dispensing lard from a shipping vessel, a machine frame, a lard centering hopper adapted for movement in such vessel, a lard extracting bucket movable into and out of the hopper, means for actuating the bucket, a bell, and means for sounding the bell when the bucket is filled.

28. In a machine for dispensing lard from a shipping vessel, a machine frame, a lard centering hopper adapted for movement in such vessel, a lard extracting bucket movable into and out of the hopper, means for actuating the bucket, a bell, a bell hammer, a bell tripping lever arranged for actuation by the lard as the bucket is filled, and means actuated by said tripping lever for setting and releasing the bell hammer.

29. In a machine for dispensing lard from a shipping vessel, a machine frame, a lard centering hopper adapted for movement in such vessel, a lard extracting bucket movable into and out of the hopper, means for actuating the bucket, a bell, a bell hammer, a bell tripping lever mounted for actuation by the lard as the bucket is filled, connections between said lever and the bell hammer for setting and tripping the latter, and a fixed trip arm with which said lever comes in contact in the upward movement of the bucket serving to throw the tripping lever outwardly.

30. In a machine for dispensing lard from a shipping vessel, a machine frame, a lard centering hopper adapted for movement in such vessel, a lard extracting bucket movable into and out of the hopper, means for actuating the bucket, and a scraper ring encircling said bucket and serving as a closure for the upper end of the hopper.

31. In a machine for dispensing lard from a shipping vessel, a machine frame, a lard centering hopper adapted for movement in such vessel, a lard extracting bucket movable into and out of the hopper, means for actuating said bucket, an expressing plunger adapted for movement into and out of the bucket, a rack bar for moving said plunger, and a measuring indicator geared to said rack bar.

In testimony whereof I affix my signature in presence of two witnesses.

HENRY E. PAOLUCCI.

Witnesses:
E. P. BURDICK,
C. W. DORMAN.